(12) United States Patent
Gilbert

(10) Patent No.: US 8,360,372 B2
(45) Date of Patent: Jan. 29, 2013

(54) STACKABLE CABLE HANGER

(76) Inventor: Reginald David Gilbert, Brantford (CA)

( * ) Notice: Subject to any disclaimer, the term of this patent is extended or adjusted under 35 U.S.C. 154(b) by 96 days.

(21) Appl. No.: 12/713,888

(22) Filed: Feb. 26, 2010

(65) Prior Publication Data

US 2010/0219300 A1 Sep. 2, 2010

Related U.S. Application Data

(60) Provisional application No. 61/202,440, filed on Feb. 27, 2009.

(51) Int. Cl.
*E21F 17/02* (2006.01)
*F16L 3/00* (2006.01)
(52) U.S. Cl. .............. 248/58; 248/65; 248/68.1
(58) Field of Classification Search .............. 248/58, 248/60–63, 68.1, 74.2, 73
See application file for complete search history.

(56) References Cited

U.S. PATENT DOCUMENTS

| | | | | |
|---|---|---|---|---|
| 355,492 A * | 1/1887 | Wiley | ................... | 248/61 |
| 591,249 A * | 10/1897 | Emery | ................... | 248/58 |
| 879,765 A * | 2/1908 | Greenleaf et al. | ....... | 248/61 |
| 886,634 A * | 5/1908 | Pleister | .................. | 248/61 |
| 967,564 A * | 8/1910 | Robinson | ............... | 248/61 |
| 1,336,558 A * | 4/1920 | Gherardi | ............... | 248/61 |
| 1,787,106 A * | 12/1930 | Glazener | ............... | 248/51 |
| 1,809,543 A * | 6/1931 | Blackburn | .......... | 24/115 H |
| 1,833,704 A * | 11/1931 | Bins | .................... | 138/107 |
| 1,914,657 A * | 6/1933 | Wells | ................ | 174/161 R |
| 1,967,134 A * | 7/1934 | Short | .................. | 174/41 |
| 2,106,006 A * | 1/1938 | Klein | .................. | 248/61 |
| 2,339,564 A * | 1/1944 | Goldberg et al. | ....... | 248/62 |
| 2,347,113 A * | 4/1944 | King | ................... | 248/62 |
| 2,554,176 A * | 5/1951 | Edwards | ............... | 224/317 |
| 2,651,826 A * | 9/1953 | Carpenter et al. | ...... | 248/507 |
| 2,684,512 A * | 7/1954 | Beman | ................ | 24/26 |
| 2,826,384 A * | 3/1958 | Brown | ................ | 248/491 |
| 2,842,218 A * | 7/1958 | Bradbury | ............ | 180/296 |
| 3,204,901 A * | 9/1965 | Dunu | .................. | 248/74.3 |
| 3,544,702 A * | 12/1970 | Bueckner et al. | ...... | 174/42 |
| 3,606,157 A * | 9/1971 | Chapin | ............... | 239/209 |
| 4,068,824 A * | 1/1978 | Flynn | ................. | 254/124 |
| 4,750,651 A * | 6/1988 | Jan | .................... | 223/89 |
| 4,790,060 A * | 12/1988 | Council et al. | ........ | 29/525.08 |
| 5,226,456 A * | 7/1993 | Semak | ............... | 138/107 |
| 6,135,397 A * | 10/2000 | Santa Cruz et al. | ..... | 248/74.1 |
| 6,361,000 B1 | 3/2002 | Jette | | |
| 6,648,279 B1 * | 11/2003 | Malin et al. | .......... | 248/65 |
| 6,902,180 B2 * | 6/2005 | Baginski | ............. | 280/420 |
| 7,025,309 B2 * | 4/2006 | Goodwin et al. | ...... | 248/74.4 |
| 7,097,142 B1 * | 8/2006 | Schmidt | ............. | 248/68.1 |
| 7,343,964 B2 * | 3/2008 | Rudy et al. | .......... | 165/162 |
| 7,766,285 B2 * | 8/2010 | Cox et al. | ........... | 248/74.2 |
| 7,959,087 B2 * | 6/2011 | Tarr | .................. | 238/10 E |
| 2002/0005463 A1* | 1/2002 | Paske et al. | ......... | 248/74.1 |
| 2003/0029972 A1* | 2/2003 | Rodgers | ............. | 248/49 |
| 2004/0084574 A1* | 5/2004 | Goodwin et al. | ...... | 248/63 |
| 2011/0139943 A1* | 6/2011 | Kerchner | ............. | 248/60 |

FOREIGN PATENT DOCUMENTS

| | | |
|---|---|---|
| CA | 2044284 | 12/1992 |
| CA | 2315025 | 2/2001 |
| CA | 2319624 | 5/2006 |
| CA | 2251732 | 3/2007 |
| CA | 2631523 | 6/2007 |

(Continued)

*Primary Examiner* — Amy J. Sterling

(57) ABSTRACT

The invention relates to a novel cable hanger for supporting at least one cable. The cable hanger comprises a cable support member having first and second ends for supporting one or more cables and a latching element extending from each of the first and second ends of the support member which is adapted to stably suspend the cable hanger.

5 Claims, 5 Drawing Sheets

FOREIGN PATENT DOCUMENTS

CA      2663381      3/2008

\* cited by examiner

400
STACKABLE CABLE HANGER

This application claims the benefit of U.S. Provisional Application No. 61/202,440, filed Feb. 27, 2009, and incorporates such provisional application in its entirety by reference.

FIELD OF THE INVENTION

The present invention generally relates to devices for supporting cables.

BACKGROUND OF THE INVENTION

Buildings require an abundance of cables to be installed that deliver services such as the internet, telephone and electricity. Examples of such cables are electrical cables, coaxial cables, network cables, alarm cables and the like. These cables are often hung or laid in an overhead space for neatness, safety, and to prevent interference of the cables with activities in a room and to prevent the cables from being damaged by people or objects.

Cables are sometimes simply placed on top of the ceiling tiles of a suspended ceiling. This is undesirable for several reasons. First, the laying of several cables or a bundle of cables may cause some or all of the ceiling tiles to sag, which is aesthetically unpleasant and may cause damage to the ceiling tiles. Second, it is against the law in several jurisdictions to lay cables in this fashion and it is considered to be a potential fire hazard with certain types of cables.

Cables may also be suspended directly using wire or tape; however, this method can be time consuming and cumbersome to both install and uninstall the cables. Furthermore, suspending cables with wire may deform or otherwise damage the cables because the wire is of a small diameter and puts significant pressure on the cables. Also, it is manually cumbersome to link wire or tape together to form more complex cable hangers which may be desirable to organize cables and to isolate cables from such things as high temperature lighting, low voltage electrical cables and other cables that were previously installed.

Custom devices are known in the prior art for laying cables. Such devices are often designed for high voltage systems and are too large and cumbersome to deploy for smaller gauge cables.

A cable management system for supporting cables is disclosed in U.S. Pat. No. 6,361,000. The device includes a flexible spine and a plurality of support members, some of which are attached to the spine. The device is capable of supporting cables in an overhead space; however, the device can be difficult to use and install when laying longer cables because it comprises a single spine despite the number of support members that may be required.

Accordingly, there is a need for a method and/or device for supporting suspended cables.

SUMMARY OF THE INVENTION

In its broad aspect, the invention provides a stackable cable hanger for supporting one or more cables. The cable hanger comprises: a cable support member having first and second ends for supporting said at least one cable, at least one latching element extending from said cable support member, said latching element adapted to stably suspend the cable hanger, at least one latch-receiving element extending from said cable support member, said latch-receiving element adapted to permit suspending a second cable hanger therefrom.

In another aspect, the invention provides a kit for assembling a cable hanger assembly, the kit comprises: a plurality of cable hangers for supporting at least one cable, each said cable hanger comprises a cable support member having first and second ends for supporting said at least one cable, at least one latching element extending from said cable support member, said latching element adapted to stably suspend the cable hanger, and at least one latch-receiving element extending from said cable support member, said latch-receiving element adapted to receive the latching element of another of said cable hangers to permit suspension of said other cable hanger therefrom; and instructions for assembling the cable hanger assembly.

In yet another aspect, the invention provides a kit for assembling a cable hanger assembly, the kit comprises: a cable hanger for supporting at least one cable, said cable hanger comprises a cable support member having first and second ends for supporting said at least one cable, at least one latching element extending from said cable support member, said latching element adapted to stably suspend the cable hanger, and at least one latch-receiving element extending from said cable support member, said latch-receiving element adapted to receive the latching element of a second like cable hanger to permit suspension of said second cable hanger therefrom; and a retainer adapted to engage with said cable hanger to retain said at least one cable on said cable support member.

BRIEF DESCRIPTION OF THE DRAWINGS

These and other aspects of the invention are described by reference to the drawings, in which.

DETAILED DESCRIPTION

Figure 1:
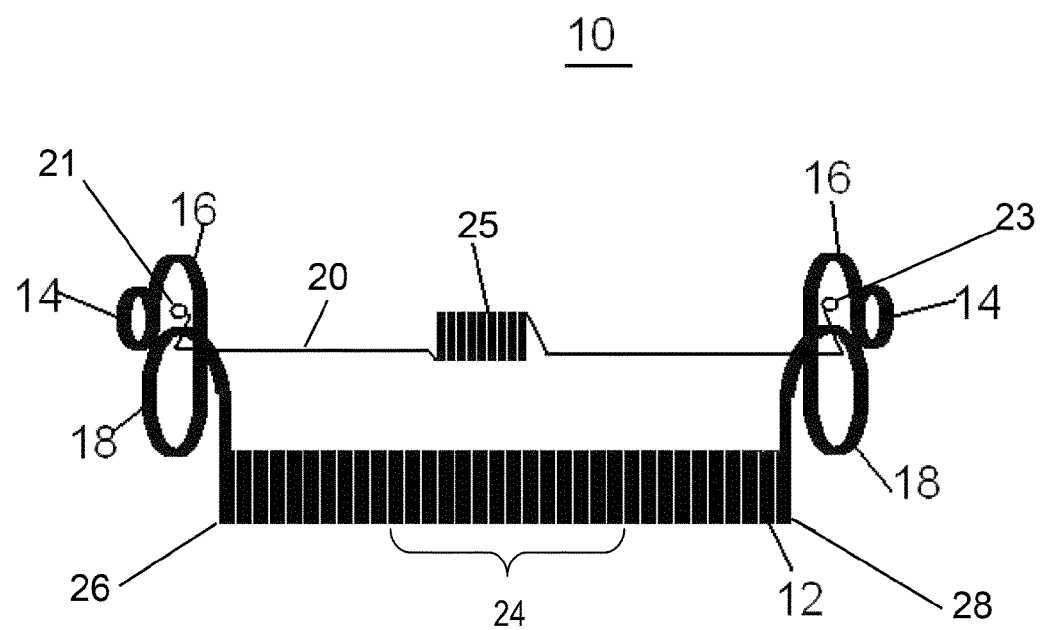
FIG. 1 is a front view of a stackable cable hanger according to an embodiment of the present invention.
Figure 5:
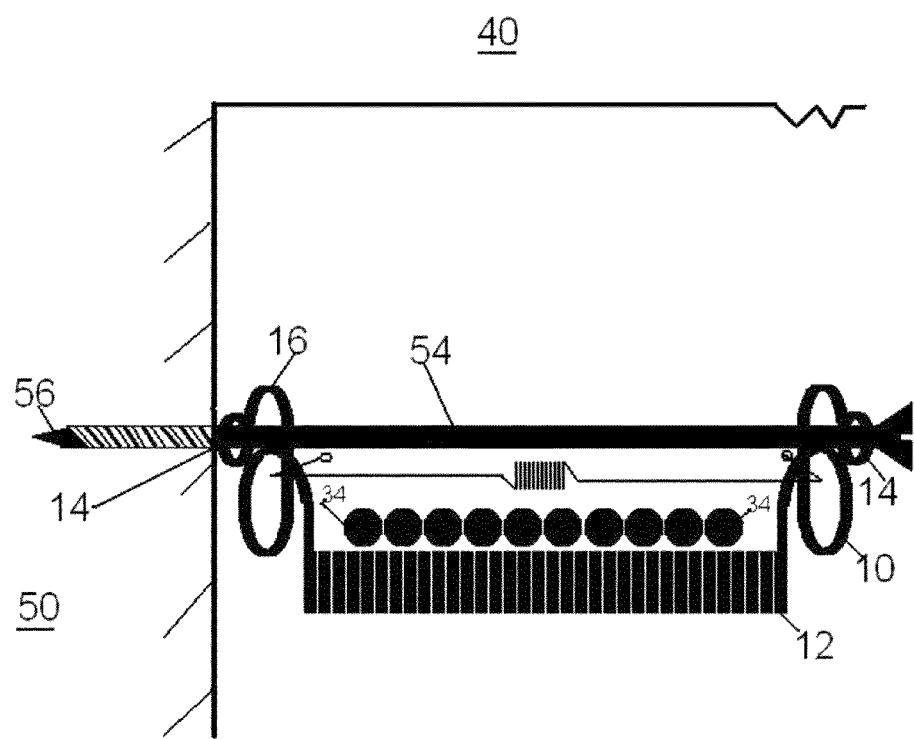
FIG. 5 is a front view of a stackable cable hanger mounted to a wall.

FIG. 1 illustrates a stackable cable hanger 10 in accordance with an embodiment of the present invention. The stackable cable hanger 10 comprises a cable support member 12 adapted to support a plurality of cables 34 (as shown in FIG. 5). Extending from the cable support member 12, at both ends 26, 28 thereof, is at least one latching element 16 adapted to suspend or otherwise maintain the cable hanger 10 in position to support cables 34. The cable hanger 10 may optionally include at least one latch-receiving element 18 adapted to join the cable hanger 10 to another like cable hanger 10.

Generally, the cable support member 12 is configured to provide support to a series of cables. The size and shape of the support member 12 may depend on the type and number of cables to be supported by the cable hanger 10. The cable support member 12 will also be made from a material that is suitable to provide the required support, e.g. metal, heavy plastic or other synthetic material. As will be appreciated, the cables 34 exert a downward force on the cable support member 12 and may cause the cable support member 12 to deform such that the central portion 24 of the cable support member 12 is lower than the ends 26, 28 of the cable support member 12. In an embodiment, the cable support member 12 is resilient so that the cable support member 12 will return to its original shape if the cables 34 are removed therefrom. In this regard, the cable support member 12 may be coil-shaped, for example, to provide resiliency. In addition, the cable support member 12 may be constructed of an appropriate material to impart resiliency such as resilient plastic, foam, metal or other material.

The latching element 16 is operable to suspend the cable hanger 10 from a ceiling 40 or other surface, e.g. another cable hanger, by latching onto an appropriate item for this purpose, for example, wire or other element(s) hanging from the ceiling or other surface. The latching element 16 may also be operable to latch directly onto another like cable hanger 10 by latching onto a latch-receiving element 18 of another cable hanger 10. In one embodiment, the latching element 16 is substantially hook-shaped as shown in FIG. 1. It will be appreciated, however, that the latching element 16 may be of a different configuration or material such as a flexible velcro strap or other flexible latch, e.g. wire, that can be manipulated into a desired form or shape. It may also comprise a component that snaps onto or otherwise connects to the cable hanger 10.

As indicated, the cable hanger 10 may include a latch-receiving element 18 operable to receive the latching element 16 of another cable hanger. Thus, the latch-receiving element 18 is shaped appropriately to receive latching element 16. In one embodiment, the latch-receiving element 18 is shaped to receive a hook-shaped latching element 16, and comprises a curved shaped, e.g., circular, oval or other curved shape. The latch-receiving element 18 may be constructed from a resilient material, and thereby additionally function as a side visual gauge to determine the extent that the cable support member 12 is being deformed by the weight of the cables 34. If the latch-receiving element 18 deforms beyond a pre-determined amount, it may be desirable to remove some cables 34 from the cable support member 12 and place them in a second cable hanger 10 which is hung from the first cable hanger 10. As shown in FIG. 1, the cable hanger 10 may include a latch-receiving element 18 extending from each end 26, 28 of the cable support member 12. The latch-receiving elements 18 may also be operable to prevent cables 34 from sliding off the ends 26, 28 of the cable support member 12.

It will be appreciated that the cable hanger 10 of the present invention may be made from a variety of different materials or a combination of different materials. For example, the cable hanger 10 may be constructed from stainless steel, brass, copper plated metals, aluminum, glass, ceramic, fibreglass and composites as well as wood. The cable hanger 10 may be constructed of a specific material based on the application for which it is intended, e.g., for applications in the medical and food industry, the cable hanger 10 may be constructed of stainless steel to comply with health, sanitation, corrosion resistance and wash down requirements. The cable hanger 10 may be integrally formed comprising a uniform material throughout. Alternatively, the cable hanger 10 may be made from individual components (i.e. cable support member 12, latching element 16, and latch-receiving element 18), made of the same or different materials, that may be assembled and disassembled from one another.

The cable hanger 10 may additionally include a retainer 20, as shown in FIG. 1, to maintain the cables 34 in place on the cable hanger 10. Such a retainer is particularly useful if it becomes necessary to remove the cable hanger 10 from the ceiling 40 for any reason. The retainer 20 may include latches 21, 23 for engaging with the cable hanger 10 and a spring 25 to provide resiliency to either engage or disengage the latches 21, 23 from the cable hanger. When the retainer 20 is engaged with the cable hanger, cables that are resting on the cable support member 12 are not removable from the cable hanger. To remove the cables 34, the retainer is bent such that the latches 21, 23 disengage from the cable hanger 10. The retainer may engage any suitable part of the cable hanger 10 so as to retain cables on the hanger 10. FIG. 1 illustrates engagement of the retainer 20 with the latch-receiving elements 18 on both ends of the cable hanger 10.

Figure 2:
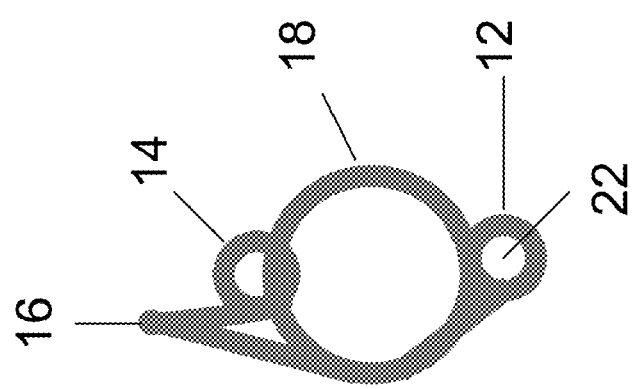
FIG. 2 is a side view of the cable support hanger of FIG. 1.

As shown in FIG. 2, the cable support member 12 may have a tubular cavity 22. The cavity 22 may be useful to receive wire or another material that is connectable to the latching element 16 or any other part of another cable hanger 10. Such an arrangement may be desirable when cables 34 of a first type (e.g. an electrical cable) are to be separated by a certain distance from cables 34 of second type (e.g. a network cable) for safety or other reasons. The cavity 22 may also serve as a storage space for retainer 20 when the retainer 20 is not in use.

Figure 3:
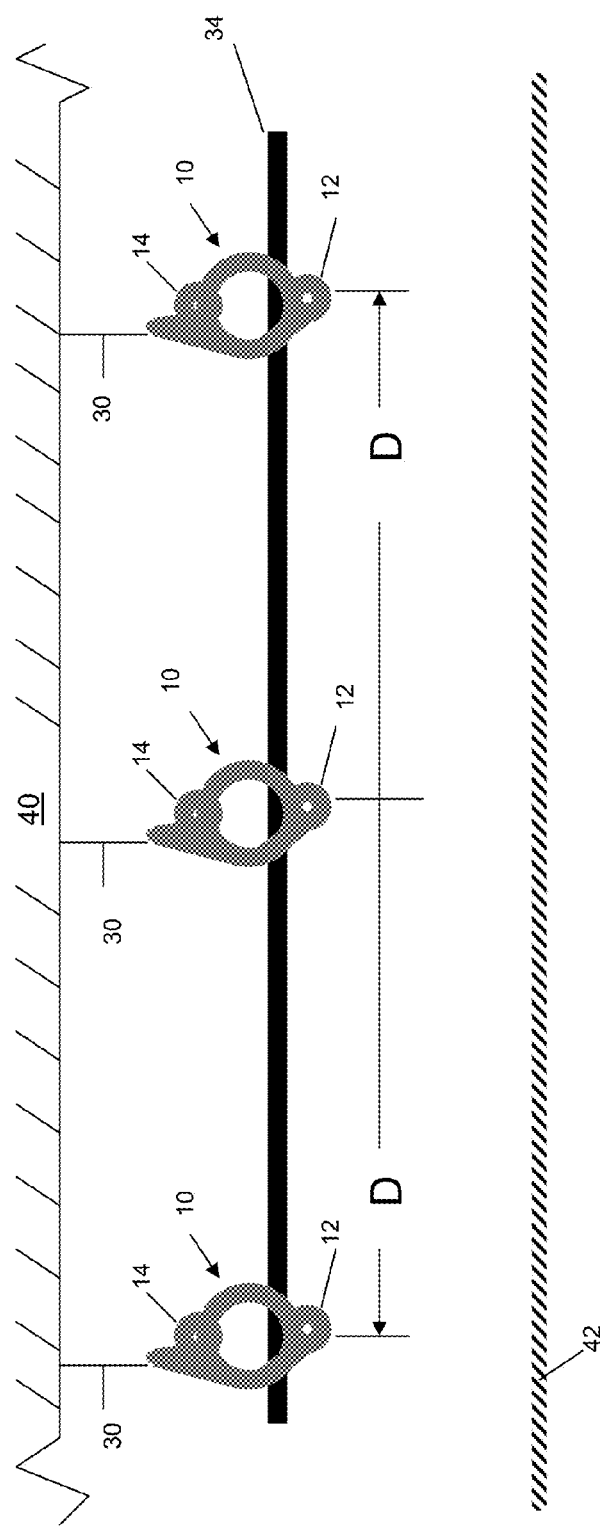
FIG. 3 is a side view of several adjacent cable support hangers of the present invention supporting a cable.

Referring to FIGS. 1 and 3, the cable hanger 10 may also include fastening elements 14 which are operable to fasten or hang the cable hanger. The fastening elements 14 may be adapted to receive wire or another hanging device to support the cable hanger 10 from an above-positioned structure. Depending on the intended use of the fastening elements 14, they may be configured to be perpendicular to the sides of the cable hanger, flush with the sides or otherwise angled, as desired. FIG. 3 illustrates an installation of cables 34 that utilizes the cable hanger 10 of the present invention. As shown, cable hangers 10 are suspended by wires 30 from a ceiling 40. The wires 30 engage with fastening elements 14 to support the cable hangers 10. It will be appreciated that support straps, string, tape or other materials may be used to support cable hangers 10 by engaging with the fastening elements 14. In addition, the cable hangers 10 may be directly connected to the ceiling using brackets or other fasteners as will be appreciated. Suspended. A cable 34 is placed on the cable support member 12 of each cable hanger 10. The cable hangers 10 are separated by a distance D, where the distance D is partially dependent on the weight of the cable 34 or a cable bundle. It will be appreciated that the distance D may be shorter where the cables 34 are flexible compared to other cables and/or heavier compared to other cables. To install the cable 34, a technician determines the optimum distance D by which to separate the cable hangers 10. The technician is then able to determine how many cable hangers 10 are to be used for the installation based on the total length of cable 34 that must be supported. The cable hangers 10 are individually attached to wires 30 that suspend from the ceiling 40 by affixing the wires 30 to the fastening elements 14. The cable 34 is then placed on each of the cable support members 12 of the cable hangers 10. Optionally, retainers 20 may be engaged with the latch-receiving elements 18 of some or all of the cable hangers 10 to ensure that the cable 34 does not separate from the cable hangers 10.

A particularly advantageous feature of the present cable hanger is the fact that it is stackable. Multiple cable hangers may be hung one from another, either directly or indirectly, to provide a layering of cables. In this regard, a cable hanger assembly may be created by linking together two cable hangers. A lower cable hanger may be linked to and supported by an upper cable hanger. To create the assembly, the latching elements of the lower cable hanger are inserted through the latch-receiving elements of the upper cable hanger such that the lower cable hanger is supported by the upper cable hanger. A bundle of cable can then be supported on both the upper and lower cable hangers.

To install a cable hanger assembly as described, the upper cable hanger may be attached to wires suspended from the ceiling by affixing the latching elements of the cable hanger to the wires. One of more cables may then be placed on the support member of the cable hanger. Next, the lower cable hanger may be linked to the upper cable hanger by inserting the latching elements of the lower cable hanger through the latch-receiving elements of the upper cable hanger. One or more cables may then be placed on the lower cable hanger. As will be appreciated, any number of cable hangers can be linked in this manner to create a desired cable hanger assembly.

Figure 4:
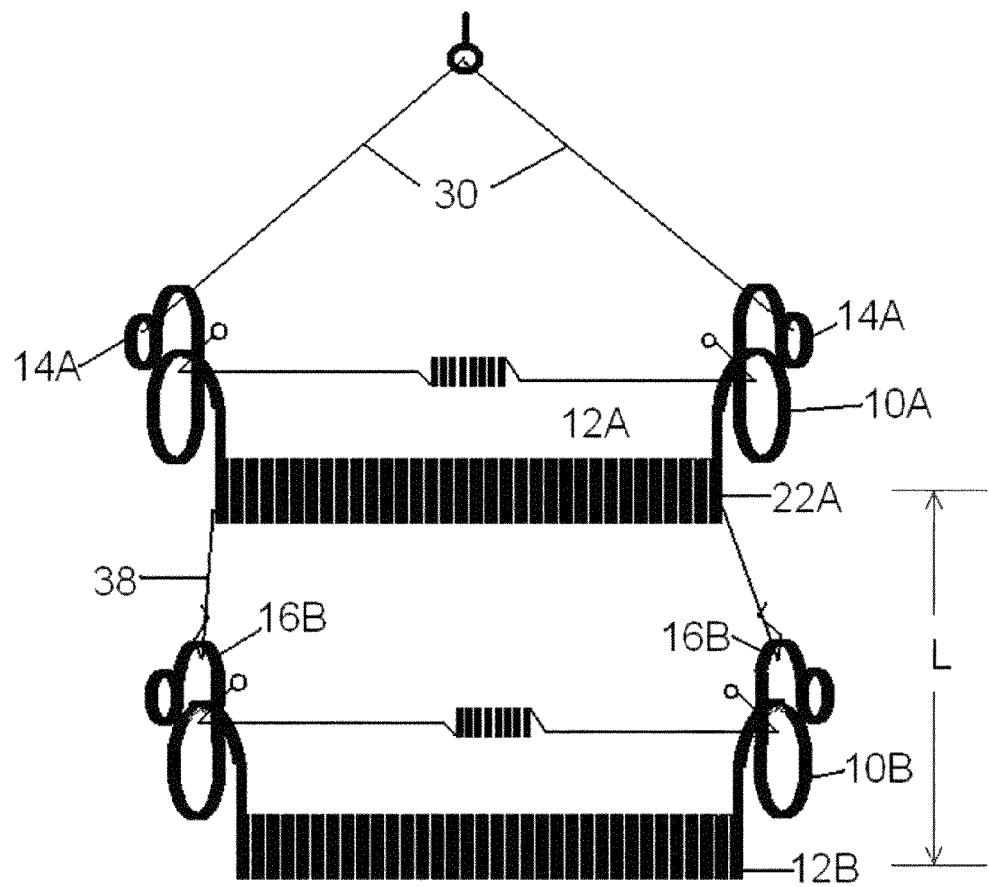
FIG. 4 is a front view of two stackable cable hangers linked together.

FIG. 4 illustrates another installation option of the cable hanger 10. The arrangement in FIG. 4 may be desirable, when for safety or other reasons, groups of cables 34 must be separated by a greater distance in the vertical direction than is permitted by the direct attachment of cable hangers as described with the cable hanger assembly above. As shown, the cable hanger 10a is suspended from above by wires 30 which are affixed to the fastening elements 14a. The cable hangers 10a may be suspended from a ceiling or another cable hanger 10. Wire 38 is inserted through the tubular cavity 22a of the cable support member 12. The ends of the wire 38 are affixed to the latching elements 16b of the cable hanger 10b. It will be appreciated that the length of the wire 38 may be chosen so that the cable support member 12a is separated in the vertical direction by a desired distance L relative to the cable support member 12b. The distance L may depend on such factors as the type and the weight of the cables that are to be supported by cable support member 12a and cable support member 12b.

Reference is next made to FIG. 5 which illustrates another installation that implements the cable hanger 10 of the present invention. As shown, the cable hanger 10 is secured by a screw 54 instead of being suspended by wire. In this embodiment, each of the fastening elements 14 has a hole for receiving a variety of fasteners such as a screw 54. The screw is inserted through the hole in each of the fastening elements 14 and the sharp end 56 of the screw 54 is inserted into the wall 50 by a screwdriver or another tool. Other mechanisms can be used to affix the cable hanger 10 to the wall 50 such as a bracket or staples as will be appreciated by one skilled in the art. Cables 34 are placed on the cable support member 12 and a retainer 20 may be secured to the latch-receiving elements 18 to ensure that the cables 34 remain on the cable hanger 10. As described above, a multitude of cable hangers 10 may be installed in this configuration, either in a vertical direction (one above another), or horizontally (connected adjacent to one another). One or both latching elements 16 may also receive a wire suspended from the ceiling 40, in addition to the screw 54 being inserted into fastening elements 14, if further support for the cable hanger 10 is desired. The cable hanger 10 of the present invention is thus operable to be affixed to a wall, suspended from a ceiling, directly affixed to a ceiling and connected to other cable hangers 10 as well as in a multitude of other arrangements.

It will be appreciated by those skilled in the art that the invention can take many forms, and that such forms are within the scope of the invention as described above. The foregoing descriptions are exemplary, and their scope should not be limited to the exemplified versions provided herein.

I claim:

1. A cable hanger for supporting at least one cable, the cable hanger comprising:
    a coiled cable support member on which one or more cables rest, said support member having first and second ends;
    a latching element extending from each of the first and second ends of the support member, said latching element adapted to stably suspend the cable hanger; and
    a latch-receiving element extending from each of the first and second ends of the support member, said latch-receiving element adapted to receive a latching element of a second cable hanger to permit suspension of the second cable hanger therefrom, wherein the latching element is a hook, the cable hanger and the second cable hanger are identical, and the cable hanger is integrally formed and stackable.

2. The cable hanger of claim 1, wherein said cable support member is resilient.

3. The cable hanger of claim 1, wherein said cable hanger is constructed of a single piece of steel wire.

4. The cable hanger of claim 1, wherein said coiled support member is hollow.

5. The cable hanger of claim 1, additionally comprising a retainer adapted to engage said cable hanger to retain said at least one cable on said cable hanger.

* * * * *